(12) United States Patent
Fischer et al.

(10) Patent No.: US 10,253,852 B2
(45) Date of Patent: Apr. 9, 2019

(54) HYDRAULIC TENSIONING DEVICE FOR A TRACTION MECHANISM DRIVE

(71) Applicant: Schaeffler Technologies AG & Co. KG, Herzogenaurach (DE)

(72) Inventors: Markus Fischer, Hessdorf (DE); Friedrich Ness, Dachsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 11 days.

(21) Appl. No.: 15/104,776

(22) PCT Filed: Nov. 18, 2014

(86) PCT No.: PCT/DE2014/200642
§ 371 (c)(1),
(2) Date: Jun. 15, 2016

(87) PCT Pub. No.: WO2015/090305
PCT Pub. Date: Jun. 25, 2015

(65) Prior Publication Data
US 2016/0327135 A1     Nov. 10, 2016

(30) Foreign Application Priority Data
Dec. 16, 2013   (DE) ................. 10 2013 225 984

(51) Int. Cl.
*F16H 7/22*     (2006.01)
*F16H 7/08*     (2006.01)

(52) U.S. Cl.
CPC ... *F16H 7/0836* (2013.01); *F16H 2007/0806* (2013.01); *F16H 2007/0814* (2013.01); *F16H 2007/0859* (2013.01)

(58) Field of Classification Search
CPC ..... F16H 2007/0806; F16H 2007/0814; F16H 2007/0859; F16H 2007/0812; F16H 7/0848
(Continued)

(56) References Cited

U.S. PATENT DOCUMENTS

| 1 A * | 7/1836 | Ruggles | B61C 11/04 16/100 |
| 2 A * | 7/1836 | Goulding | C02F 1/00 57/58.49 |

(Continued)

FOREIGN PATENT DOCUMENTS

| CN | 101663521 A | 3/2010 |
| CN | 102135162 | 7/2011 |

(Continued)

*Primary Examiner* — Henry Y Liu
(74) *Attorney, Agent, or Firm* — Davidson, Davidson & Kappel, LLC

(57) ABSTRACT

A hydraulic tensioning device, which is used in traction drives of internal combustion engines and which includes a piston (19) that is supplied with a hydraulic fluid, is provided. The piston is movably guided in a linear manner in a cylinder and is spring-loaded against a traction device. The hydraulic fluid can flow into a pressure chamber (17) via a non-return valve or out of the pressure chamber (17) via a pressure-relief valve (20), depending on an adjustment movement direction of the piston (19). For this purpose, the pressure-relief valve (20) is inserted in a central receiving area (16) of the piston (19) on the pressure-chamber side as a premountable valve group (21) and includes a pot-shaped valve housing (18) and into which a guide element (25) with a corresponding valve seat (29), a valve element designed as a valve plate (30), and a pressure spring (31) are integrated.

16 Claims, 2 Drawing Sheets

(58) Field of Classification Search
USPC .......................................................... 474/110
See application file for complete search history.

(56) References Cited

U.S. PATENT DOCUMENTS

| | | | | |
|---|---|---|---|---|
| 1,511,516 | A | | 10/1924 | Goodfellow |
| 4,507,103 | A | * | 3/1985 | Mittermeier .......... F16H 7/0836 474/110 |
| 4,525,098 | A | * | 6/1985 | Krude .................... F16D 1/027 285/256 |
| 4,708,318 | A | * | 11/1987 | Simo ...................... F16K 31/60 16/DIG. 41 |
| 4,886,392 | A | * | 12/1989 | Iio ......................... B23P 11/00 29/525 |
| 4,903,543 | A | * | 2/1990 | Matt ...................... B23P 11/00 403/282 |
| 5,032,036 | A | * | 7/1991 | Murakami ............. F16D 1/072 403/282 |
| 5,066,147 | A | * | 11/1991 | Brandenstein ......... B21K 25/00 384/537 |
| 5,307,708 | A | * | 5/1994 | Matt ...................... B23P 11/00 123/90.6 |
| 5,387,016 | A | * | 2/1995 | Joseph ................. F16L 33/2076 285/148.16 |
| 5,442,885 | A | * | 8/1995 | Laven ..................... E04C 3/07 29/453 |
| 5,707,309 | A | * | 1/1998 | Simpson .................. F16H 7/08 474/110 |
| 5,879,256 | A | * | 3/1999 | Tada ........................ F16H 7/08 474/110 |
| 6,193,623 | B1 | * | 2/2001 | Koch .................... F16H 7/0836 474/110 |
| 6,322,468 | B1 | * | 11/2001 | Wing ........................ F16H 7/08 474/109 |
| 6,361,458 | B1 | * | 3/2002 | Smith .................... F16H 7/0848 474/109 |
| 6,383,103 | B1 | * | 5/2002 | Fujimoto ................. F01L 1/02 474/109 |
| 6,398,682 | B1 | * | 6/2002 | Suzuki ..................... F16H 7/08 474/110 |
| 6,435,993 | B1 | * | 8/2002 | Tada .................... F16H 7/0836 474/109 |
| 6,502,538 | B2 | * | 1/2003 | Leuthold ................. F16D 1/072 123/90.6 |
| 6,592,479 | B2 | * | 7/2003 | Nakakubo ............. F16H 7/0848 474/109 |
| 6,805,540 | B2 | * | 10/2004 | Ishihara ............. B29D 30/0606 425/28.1 |
| 7,610,831 | B2 | * | 11/2009 | Burgler .................... B23P 11/00 74/567 |
| 7,618,339 | B2 | * | 11/2009 | Hashimoto ............... F01L 1/02 474/109 |
| 7,721,432 | B2 | * | 5/2010 | Burgler .................... B23P 9/02 198/346.3 |
| 7,775,924 | B2 | * | 8/2010 | Koch .................... F16H 7/0848 251/337 |
| 7,883,288 | B2 | * | 2/2011 | Jorna ................... F16B 7/0453 403/171 |
| 8,317,643 | B2 | * | 11/2012 | Hofmann ............. F16H 7/0848 474/101 |
| 9,797,519 | B2 | | 10/2017 | Gyger et al. |
| 2002/0096014 | A1 | * | 7/2002 | Leuthold ................. F16D 1/072 74/567 |
| 2004/0150273 | A1 | * | 8/2004 | Fujioka .................. B23P 11/00 310/68 D |
| 2008/0015069 | A1 | * | 1/2008 | Kroon ................... F16H 7/0836 474/110 |
| 2008/0164694 | A1 | * | 7/2008 | Zdroik ................. F02M 69/462 285/331 |
| 2008/0261737 | A1 | | 10/2008 | Yoshida et al. |
| 2013/0017913 | A1 | * | 1/2013 | Hartmann ............. F16H 7/0848 474/110 |
| 2013/0269462 | A1 | * | 10/2013 | Taniguchi ............... F16H 48/38 74/434 |

FOREIGN PATENT DOCUMENTS

| | | |
|---|---|---|
| DE | 36 39 389 A1 | 5/1988 |
| DE | 10 2004 048 281 A1 | 4/2006 |
| DE | 102007061298 | 8/2008 |
| DE | 102007057783 | 6/2009 |
| DE | 102011079184 | 1/2013 |
| DE | 102011088214 | 6/2013 |
| JP | 2004176821 | 6/2004 |

\* cited by examiner

HYDRAULIC TENSIONING DEVICE FOR A TRACTION MECHANISM DRIVE

The present invention relates to a hydraulic tensioning device which is used in traction mechanism drives of internal combustion.

BACKGROUND

Hydraulic tensioning devices are used primarily for traction mechanism drives such as chain or belt drives which effectively compensate for a changing length of the traction means in the operating condition due to heating and/or wear. To reduce force peaks in a traction mechanism drive and thus in the hydraulic tensioning device, it is known that a pressure relief valve may be assigned to the pressure chamber of the tensioning device.

A tensioning device of the design described above is known from DE 36 39 389 A1 in which a chain as the traction means is tensioned. The design of the tensioning device includes an inflow opening in the housing of the tensioning device designed as a cylinder in which a spring-loaded non-return valve is situated. A spring-loaded pressure relief valve is inserted into the outflow channel introduced into the piston on the traction means side. With relative movements—excited by vibrations or movements of the chain—oil passes between the piston and the housing, from a storage tank, via the non-return valve into the interior of the tensioning device. When pressure peaks occur, the pressure relief valve opens and the chain is lubricated by the oil output at the same time.

DE 10 2004 048 281 A1 describes another hydraulic tensioning device, which includes a cylinder housing, in which a piston is axially movable, this piston being acted upon by a compression spring and oil pressure. Oil enters the pressure chamber through a non-return valve in the cylinder housing for the purpose of attenuation/readjustment. The piston is acted upon in the direction of a spring-loaded traction means by pressure and a compression spring. To prevent inadmissible pressure peaks in the cylinder housing, on which the oil pressure acts, which occur, for example, at a resonance speed of the traction mechanism drive, a pressure relief valve is provided, opening toward the outside in the piston bottom and also referred to as a pressure-limiting valve.

SUMMARY OF THE INVENTION

It is an object of the present invention to provide a hydraulic tensioning device, in which a pressure relief valve simple to install in the piston and having an inexpensive design, is used as an independent assembly.

According to the present invention a hydraulic tensioning device is provided, in which a premountable valve group is inserted into a central receptacle of the piston as a pressure relief valve on the pressure chamber side in a force- and/or form-fitting manner. The valve group forming an independent assembly of the piston includes a pot-shaped valve housing, also referred to as a valve cap, into which a guide element including the respective valve seat, a valve body and a compression spring are integrated. It is thus possible to implement a valve group of a simple design, optimized with regard to cost and components as a pressure relief valve, which is still mountable in the piston on the pressure chamber side in a simplified manner without a positional orientation.

The present invention advantageously offers the possibility of implementing a pressure relief valve, which forms an independent assembly, including a minimum of individual components due to the design of the premountable valve group. At the same time, there may be a fluid-tight and air-tight joining of the valve group in the piston without prior complex machining of the joined components. A further cost reduction is achieved through the concept according to the present invention due to the fact that it is sufficient to replace the valve group if leakage of the pressure relief valve occurs as part of a leakage test. Both the piston and the valve seat are usually manufactured as hardened components. With previous approaches, a very accurate and cost-intensive finishing of these individual parts was necessary to permit a press fit. Due to the concept according to the present invention, these components may be joined inexpensively without reworking and consequently may be manufactured with a greater tolerance.

A preferred embodiment of the present invention includes a valve group, whose guide element engages on the outside with a partial or circumferential flange enclosing the valve seat in a step bore in the valve housing. The valve body, designed as a valve plate or valve ball, is guided by this flange in a loss-proof manner. When the valve assembly forming the pressure relief valve is closed, the valve body acted upon by the compression spring is sealingly supported on the valve seat.

The valve housing may be pressed into the receptacle in the form of a central bore in the piston as a measure to achieve a quick and simplified assembly. To achieve a secure installation position, a coverage ratio between an inside diameter of the piston receptacle and an outside diameter of the valve housing is preferably between 0.5% and 17%.

To achieve a more secure installation position, the valve housing has multiple protruding retaining noses distributed around the circumference on the outside, these noses being capable of elastic deformation to a limited extent, to create a press fit during insertion of the valve assembly into the piston receptacle. The number and/or design of the retaining noses, i.e., the protrusions, is/are such that they ensure a stable, form-fitting and force-locking installation position of the valve housing in the piston receptacle.

Furthermore, according to the present invention, the pressure relief valve, designed as a valve group, may be inserted into the piston with a clearance fit. Targeted leakage in a ring gap between the inside wall of the piston receptacle and an outside contour of the valve group may be established by using this measure. Thus, for example, venting and/or a defined reduction in a supporting force of the piston of the tensioning device on the traction means may be achieved. A valve housing inserted loosely into the piston is preferably positioned by an additional fixing, for which a local radial forming or flanging of a piston inside wall in the area of the receptacle is suitable, for example.

Preferred, effective and secure fixing of the guide element in the valve housing may be achieved by radial forming of an edge zone of the valve housing. For this purpose, after joining of the guide element in the valve housing and achieving a final position starting from a protruding flange of the valve housing, a bead directed radially inward and forming an axial stop for the guide element is formed by a forming or flanging process.

The design of the pressure relief valve according to the present invention also provides for a displacement limitation for the valve body, the limitation being defined by limited by the valve seat, on the one hand, and, on the other hand, by a step or a collar on the valve housing protruding radially inward, for example. For the compression spring acting upon the valve body, it is provided that this spring is guided and supported in a longitudinal bore in the valve housing designed as a blind hole having a central control opening.

The tensioning device preferably includes a piston made of a metallic material, which is combined with a valve housing made of steel or a metallic material. To manufacture the piston, a noncutting forming method such as an extrusion or a pressure forming is suitable. A deep-drawing or extrusion or pressure forming method may also be used advantageously for the valve housing.

BRIEF DESCRIPTION OF THE DRAWINGS

Additional features of the present invention are derived from the following description of the drawings, which show one exemplary embodiment of the present invention. The specific embodiment illustrated here shows an example of an approach according to the present invention, but it does not constitute an ultimate limitation on the present invention.

DETAILED DESCRIPTION

Figure 1:
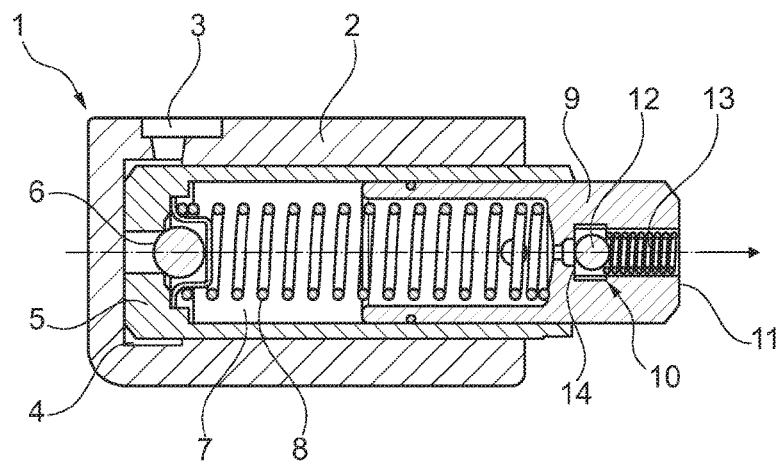
FIG. 1 shows a hydraulic tensioning device of the previous design.

FIG. 1 shows a hydraulic tensioning device 1 including a housing 2, which includes a pressure oil connection 3, starting from which oil as hydraulic fluid enters an annular space 4. The oil flows through a non-return valve 6, inserted into a cylinder 5 at the bottom, into a pressure chamber 7 and acts upon it, supported by a compression spring 8 introduced into the pressure chamber 7, a piston 9 in the direction of the arrow, operatively connected in the installed condition directly or indirectly to a traction means, for example, a chain of a traction mechanism drive (not shown). On the side facing away from the pressure chamber 7 in a piston bottom 11, a pressure relief valve 10 is integrated into piston 9. Pressure relief valve 10, which opens toward the outside, is inserted centrally into piston 9 and includes a valve body 12, which is designed as a ball and is sealingly supported on a valve seat 14 in the closed condition with the aid of a compression spring 13.

Figure 2:
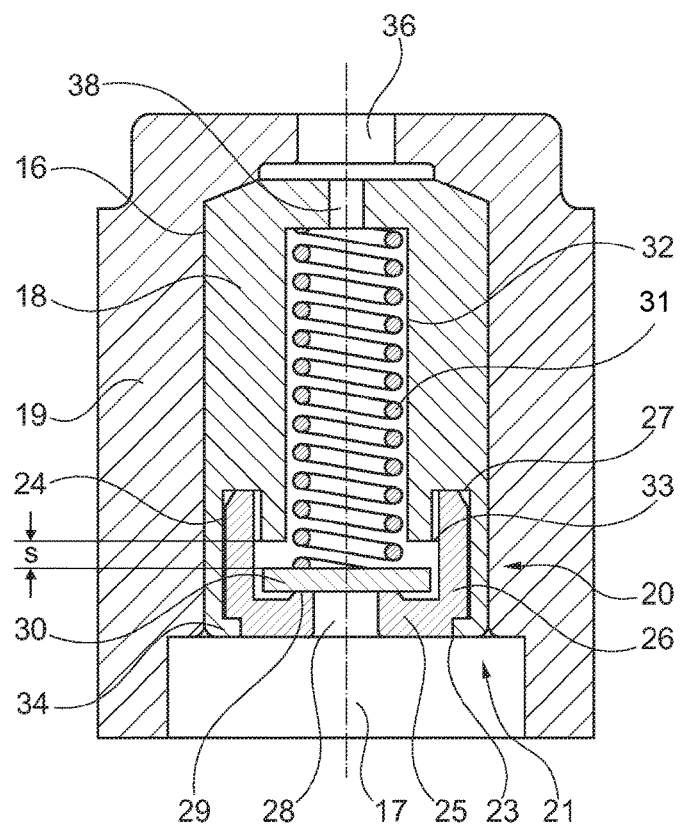
FIG. 2 shows a piston of the tensioning device, into which a valve group according to the present invention, designed as a plate valve, is integrated

FIG. 2 shows a detail of a hydraulic tensioning device, which relates to a piston 19, including a valve group 21 according to the present invention, which includes a pressure relief valve 20 and is introduced into piston 19 on the side directed to pressure chamber 17. Valve group 21 includes a pot-shaped valve housing 18, which is also known as a valve cap and is preferably pressed into a cylindrical receptacle 16 in piston 19 with a press fit, so that it is flush. A guide element 25, forming a preferably closed flange 26 on the outside, whose end area is fitted into an annular groove 27 in valve housing 18, is inserted into a central step bore 24 in valve housing 18 at the end, pointing to pressure chamber 17. Guide element 25 forms a valve seat 29 for a valve body designed as a valve plate 30 on the inside around a central opening 28, the valve body being guided by flange 26 on the outside. Valve plate 30, which cooperates with a wear-resistant hardened valve seat 29, is acted upon by a compression spring 31 inserted into a longitudinal bore 32 in valve housing 18, a collar 33 on valve housing 18 limiting an adjusting path S of valve plate 30. While pressure relief valve 20 is open, hydraulic fluid flows from longitudinal bore 32 through a connecting bore 38 into an opening 36 in valve housing 18. For fixing the position of guide element 25 in valve housing 18, with which, at the same time, all components of valve group 21 are combined into one unit, a protruding projection on valve housing 18 being shaped radially inward to form a bulge 34, which is fitted in a form-fitting manner into a circumferential step 23 on guide element 25.

Figure 3:
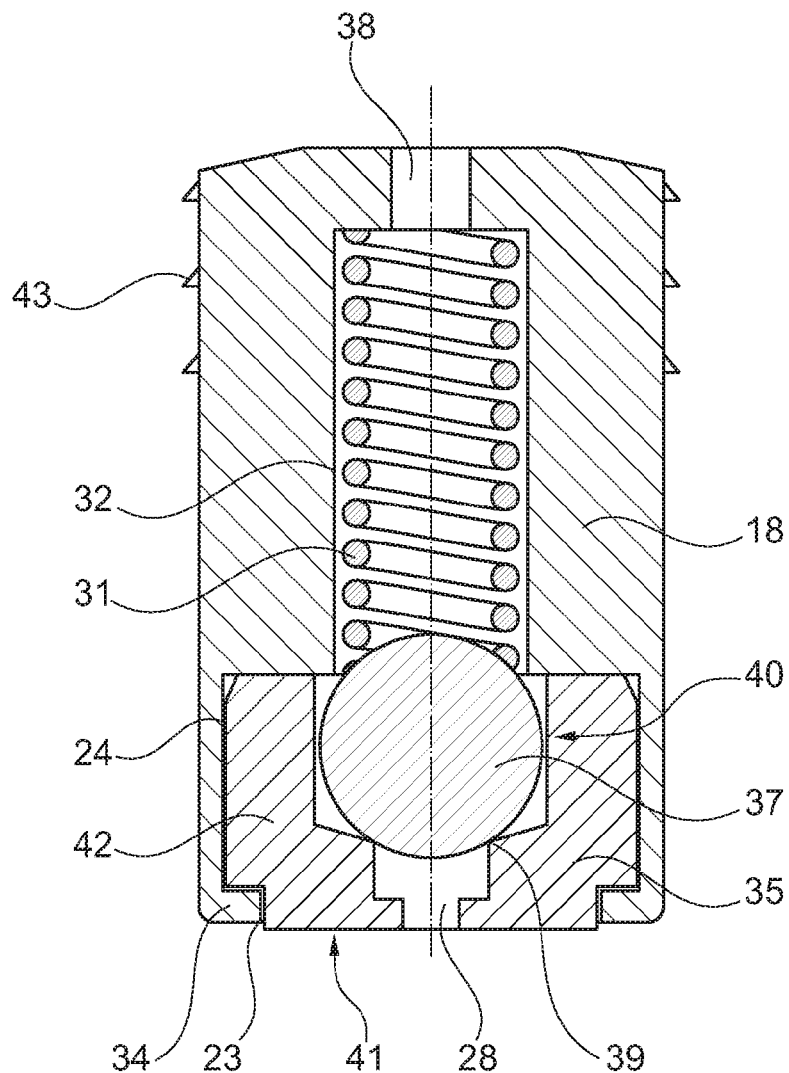
FIG. 3 shows the valve group designed as a ball valve.

FIG. 3 shows valve group 41 as an alternative specific embodiment to valve assembly 21 according to FIG. 2, corresponding reference numerals being used for the same components or those having the same function. The following description is largely limited to different embodiments. Valve assembly 41 forms pressure relief valve 37, including as a valve body a valve ball 40, which is assigned to a suitably adapted guide element 35, including valve seat 39 and flange 42 on the outside. Valve housing 18 has retaining noses 43 spaced a distance apart from one another axially on the outside and situated partially or circumferentially. In the installed condition of valve assembly 21, retaining noses 43 cause a secure, form-fitting and force-locking fastening inside piston 19.

LIST OF REFERENCE NUMERALS 1 tensioning device
2 housing
3 pressure connection
4 annular space
5 cylinder
6 non-return valve
7 pressure chamber
8 compression spring
9 piston
10 pressure relief valve
11 piston bottom
12 valve body
13 compression spring
14 valve seat
16 receptacle
17 pressure chamber
18 valve housing
19 piston
20 pressure relief valve
21 valve group
23 step
24 step bore
25 guide element
26 flange
27 annular groove
28 opening
29 valve seat
30 valve plate
31 compression spring
32 longitudinal bore
33 collar
34 bulge
35 guide element
36 opening
37 valve ball
38 connecting bore
39 valve seat
40 pressure relief valve
41 valve group
42 flange
43 retaining nose

What is claimed is:

1. A hydraulic tensioning device usable in a traction mechanism drive of an internal combustion engine, the hydraulic tensioning device comprising:
a piston acted upon by hydraulic fluid, the piston guided in a linearly displaceable manner in a cylinder and spring-loaded against a traction device, the hydraulic fluid being able to flow into a pressure chamber via a non-return valve or out of the pressure chamber via a pressure relief valve, depending on an actuation direction of the piston, a premountable valve group being inserted into a central receptacle of the piston as the pressure relief valve, the valve group including a pot-shaped valve housing, a guide element including the respective valve seat, a valve body and a compression spring being integrated into the valve housing, the valve housing including a collar limiting an adjusting path of the valve body.

2. The tensioning device as recited in claim 1 wherein the guide element engages on an outside with a partial or circumferential flange enclosing the valve seat in a step bore of the valve housing.

3. The tensioning device as recited in claim 1 wherein in a closed condition of the pressure relief valve, the valve body acted upon by the compression spring is guided on an outside on a flange of the guide element in a loss-proof manner and designed as a valve plate or a valve ball is sealingly supported on the valve seat, the valve seat being hardened.

4. The tensioning device as recited in claim 1 wherein the valve housing of the valve group is pressed into a receptacle of the piston, a coverage ratio between 0.5% and 17% being provided between an inside diameter of the receptacle and an outside diameter of the valve housing.

5. The tensioning device as recited in claim 1 wherein the valve housing of the valve group has at least one protruding retaining nose distributed on a circumference on an outside, with the aid of which the valve housing is fixed in the receptacle of the piston in a form-fitting and force-locking manner.

6. The tensioning device as recited in claim 1 wherein the valve housing of the valve group is inserted with a clearance fit into the piston and is positioned with the aid of an additional fixing.

7. The tensioning device as recited in claim 1 wherein for fixing the guide element in the valve housing, a bulge being directed radially inward and forming an axial stop for the guide element, starting from a protruding edge of the valve housing the bulge being manufactured by forming.

8. The tensioning device as recited in claim 1 wherein a displacement of the valve body designed as a valve plate is limited by the valve seat of the guide element and by a collar of the valve housing.

9. The tensioning device as recited in claim 1 wherein the compression spring is guided and supported in a longitudinal bore of the valve housing and cooperates mutually with the valve body.

10. The tensioning device as recited in claim 1 wherein the valve housing is manufactured from a metallic material and inserted into the piston, the piston being made of a metal material.

11. The tensioning device as recited in claim 1 wherein the guide element includes an end era fitted into an annular groove in the valve housing.

12. The tensioning device as recited in claim 11 wherein the guide element is inserted into a central step bore in the valve housing.

13. The tensioning device as recited in claim 1 wherein the valve housing has retaining noses spaced a distance apart from one another axially on an outer circumference of the valve housing, the retaining noses causing a secure, form-fitting and force-locking fastening inside the piston.

14. The tensioning device as recited in claim 1 wherein an end of the valve housing facing the pressure chamber is aligned within an end of the guide element facing the pressure chamber.

15. The tensioning device as recited in claim 1 wherein the valve housing is a single piece.

16. A hydraulic tensioning device usable in a traction mechanism drive of an internal combustion engine, the hydraulic tensioning device comprising:
a piston acted upon by hydraulic fluid, the piston guided in a linearly displaceable manner in a cylinder and spring-loaded against a traction device, the hydraulic fluid being able to flow into a pressure chamber via a non-return valve or out of the pressure chamber via a pressure relief valve, depending on an actuation direction of the piston, a premountable valve group being inserted into a central receptacle of the piston as the pressure relief valve, the valve group including a pot-shaped valve housing, a guide element including the respective valve seat, a valve body and a compression spring being integrated into the valve housing, the valve housing including a bulge fitted in a form-fitting manner into a circumferential step on the guide element to fix a position of the guide element in the valve housing.

* * * * *